United States Patent
Rossi et al.

(10) Patent No.: US 11,512,836 B2
(45) Date of Patent: Nov. 29, 2022

(54) MULTI-MODE ILLUMINATION MODULE AND RELATED METHOD

(71) Applicant: AMS SENSORS SINGAPORE PTE. LTD., Singapore (SG)

(72) Inventors: Markus Rossi, Jona (CH); Martin Lukas Balimann, Zurich (CH); Mai-Lan Elodie Boytard, Zurich (CH); Bassam Hallal, Thalwil (CH); Daniel Pérez Calero, Zurich (CH); Julien Boucart, Zurich (CH); Hendrik Volkerink, Santa Clara, CA (US)

(73) Assignee: ams Sensors Singapore Pte. Ltd., Singapore (SG)

( * ) Notice: Subject to any disclaimer, the term of this patent is extended or adjusted under 35 U.S.C. 154(b) by 1161 days.

(21) Appl. No.: 16/072,818

(22) PCT Filed: Jan. 24, 2017

(86) PCT No.: PCT/SG2017/050035
§ 371 (c)(1),
(2) Date: Jul. 25, 2018

(87) PCT Pub. No.: WO2017/131585
PCT Pub. Date: Aug. 3, 2017

(65) Prior Publication Data
US 2019/0049097 A1 Feb. 14, 2019

Related U.S. Application Data

(60) Provisional application No. 62/287,131, filed on Jan. 26, 2016.

(51) Int. Cl.
*F21V 14/06* (2006.01)
*F21V 5/00* (2018.01)
(Continued)

(52) U.S. Cl.
CPC .......... *F21V 14/06* (2013.01); *F21S 10/023* (2013.01); *F21V 5/004* (2013.01); *F21V 5/007* (2013.01);
(Continued)

(58) Field of Classification Search
CPC ...... F21V 5/004; F21V 5/007; F21Y 2105/12; G02B 19/0057; G02B 19/0066
See application file for complete search history.

(56) References Cited

U.S. PATENT DOCUMENTS 8,320,621 B2 11/2012 McEldowney
9,273,846 B1 3/2016 Rossi et al.
(Continued)

FOREIGN PATENT DOCUMENTS

CN 101174096 A 5/2008
WO 2012058360 A2 5/2012
WO 2016/122404 8/2016

OTHER PUBLICATIONS

ISA/AU, International Search Report for PCT/SG2017/050035 (dated Apr. 24, 2017).
(Continued)

*Primary Examiner* — William N Harris
(74) *Attorney, Agent, or Firm* — Michael Best & Friedrich LLP

(57) ABSTRACT

The illumination module for emitting light (5) can operate in at least two different modes, wherein in each of the modes, the emitted light (5) has a different light distribution. The module has a mode selector (10) for selecting the mode in which the module operates, and it has an optical arrangement. The arrangement includes—a microlens array (LL1) with a multitude of transmissive or reflective microlenses (2) which are regularly arranged at a lens pitch P (P1);—an illuminating unit for illuminating the microlens array (LL1).
(Continued)

Figure 1:
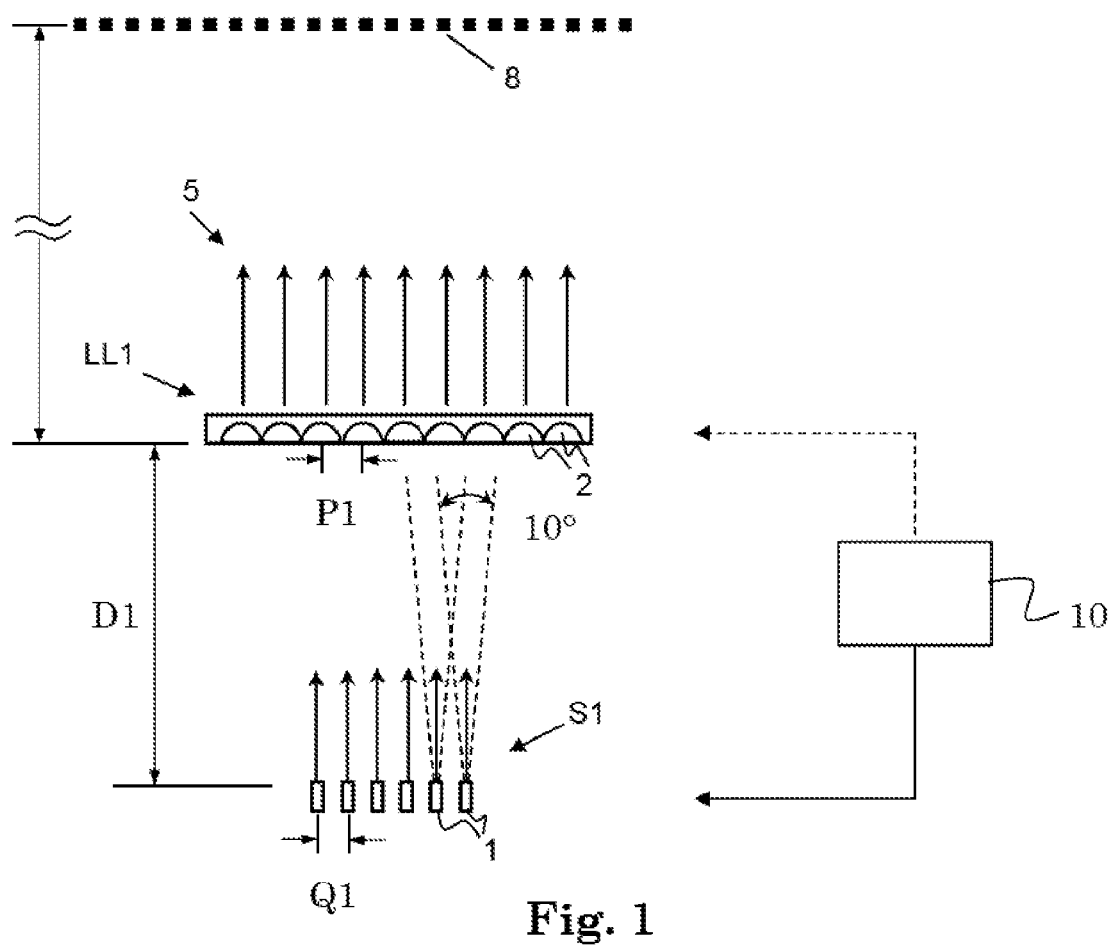

The illuminating unit includes a first array of light sources (S1) operable to emit light of a first wavelength L1 each and having an aperture each. The apertures are located in a common emission plane which is located at a distance D (D1) from the microlens array (LL1). In a first one of the modes, for the lens pitch P, the distance D and the wavelength L1 applies $P^2 = 2 \cdot L1 \cdot D/N$ wherein N is an integer with $N \geq 1$.

18 Claims, 4 Drawing Sheets

(51) Int. Cl.
| | | |
|---|---|---|
| F21V 23/04 | (2006.01) | |
| G01S 7/481 | (2006.01) | |
| G01C 3/08 | (2006.01) | |
| G02B 27/20 | (2006.01) | |
| F21S 10/02 | (2006.01) | |
| F21V 23/00 | (2015.01) | |
| G01S 17/08 | (2006.01) | |
| F21Y 105/12 | (2016.01) | |
| F21W 131/406 | (2006.01) | |
| F21V 17/02 | (2006.01) | |
| F21V 14/02 | (2006.01) | |
| F21Y 105/10 | (2016.01) | |
| F21V 5/02 | (2006.01) | |
| F21Y 115/30 | (2016.01) | |
| F21Y 113/13 | (2016.01) | |
| F21Y 105/14 | (2016.01) | |
| F21Y 115/10 | (2016.01) | |
| F21V 13/04 | (2006.01) | |

(52) U.S. Cl.
CPC .......... *F21V 23/003* (2013.01); *F21V 23/04* (2013.01); *G01C 3/08* (2013.01); *G01S 7/4814* (2013.01); *G01S 7/4815* (2013.01); *G01S 17/08* (2013.01); *G02B 27/20* (2013.01); *F21V 5/008* (2013.01); *F21V 5/02* (2013.01); *F21V 13/04* (2013.01); *F21V 14/02* (2013.01); *F21V 17/02* (2013.01); *F21W 2131/406* (2013.01); *F21Y 2105/10* (2016.08); *F21Y 2105/12* (2016.08); *F21Y 2105/14* (2016.08); *F21Y 2113/13* (2016.08); *F21Y 2115/10* (2016.08); *F21Y 2115/30* (2016.08)

(56) References Cited

U.S. PATENT DOCUMENTS

| | | | |
|---|---|---|---|
| 2010/0061090 A1 | 3/2010 | Bergman et al. | |
| 2010/0118123 A1* | 5/2010 | Freedman | G06T 7/521 |
| | | | 348/E5.025 |
| 2011/0174998 A1* | 7/2011 | Molnar | G01S 3/782 |
| | | | 250/550 |
| 2012/0051588 A1* | 3/2012 | McEldowney | G03B 21/14 |
| | | | 348/46 |
| 2012/0257191 A1* | 10/2012 | Deckenbach | G07D 7/121 |
| | | | 29/622 |
| 2016/0215955 A1* | 7/2016 | Donato | G02B 3/0056 |
| 2017/0268749 A1* | 9/2017 | Pet | G02B 26/123 |

OTHER PUBLICATIONS

Taiwanese Patent Office Action and Search Report for Application No. 106102673 dated Jun. 1, 2020 (12 pages including English translation).

Third Office Action issued from the Chinese Patent Office for related Application No. 201780006895.1 dated Feb. 22, 2021 (19 Pages including English Translation).

Chinese Patent Office First Office Action for Application No. 201780006895.1 dated Nov. 19, 2019 (17 pages including English translation).

* cited by examiner

MULTI-MODE ILLUMINATION MODULE AND RELATED METHOD

CROSS-REFERENCE TO RELATED APPLICATION(S)

This application is the National Stage of International Application No. PCT/SG2017/050035, filed on Jan. 24, 2017, which claims the benefit of priority U.S. Application No. 62/287,131, filed on Jan. 26, 2016. The disclosure of the prior applications is incorporated herein by reference.

The disclosure relates to the field of optics and in particular to modules for illuminating a scene and also to the generation of structured light and patterned illumination. It relates to corresponding apparatuses and methods.

DEFINITION OF TERMS

"Passive optical component": An optical component redirecting light by refraction and/or diffraction and/or (internal and/or external) reflection such as a lens, a prism, a mirror (plane or curved), or an optical system, wherein an optical system is a collection of such optical components possibly also comprising mechanical elements such as aperture stops, image screens, holders.

"Light": Most generally electromagnetic radiation; more particularly electromagnetic radiation of the infrared, visible or ultraviolet portion of the electromagnetic spectrum.

Illumination modules can be used for illuminating a scene, for example in cases where, based on light returning from the scene in response to the illumination, a distance to an object present in the scene shall be determined. For some techniques of distance determination, structured light can be emitted from the illumination module.

For example, a light pattern created in the scene by the structured light makes possible distinguish bodies according to their distance from the apparatus emitting the structured light. Game consoles, for example, may comprise a pattern projector for illuminating a scene with structured light in which a player is present, while the so-illuminated scene is imaged and analyzed so as to achieve a 3D mapping of the scene, also referred to as depth mapping.

Structured light is often also referred to as encoded light or patterned light, such that these terms are, in the present patent application, used interchangeably. The term "structured light" is mostly used when the light is evaluated for determining distances by means of triangulation techniques. "Patterned light", on the other hand, is mostly used when the light is evaluated for determining distances using stereovision, wherein the light is in this case typically used for contrast enhancement. Patterned light does not necessarily mean that a regular pattern is generated or projected. E.g., a generated or projected light texture can include randomly arranged features or random features.

Some examples of related art are discussed briefly below.

U.S. Pat. No. 7,970,177 B2, for example, describes an apparatus for distance calculation based on the generation of structured light using diffractive optical elements.

US2012/038986A1 describes a pattern projector using diffractive optical elements.

US2010/118123A1 describes an apparatus for mapping an object including an illumination assembly which includes a single transparency containing a fixed pattern of spots. Therein, a light source transilluminates the single transparency with optical radiation so as to project the pattern onto the object.

US2013/038941A1 describes an optical apparatus including a matrix of light sources arranged on a substrate with a predetermined, uniform spacing between the light sources. A microlens array of the same uniform spacing is arranged close to the microlens array, so as to collimate the light emitted from the light sources and establish a beam homogenizer.

WO2014/083485A1 describes a laser device for projecting a structured light pattern onto a scene comprising several arrays of semiconductur lasers.

U.S. Pat. No. 8,320,621 describes a projector for use in a 3-D imaging device. The projector includes a light source formed of a vertical-cavity surface-emitting laser, or VCSEL array. The light from the VCSEL array is focused through a collimating micro-lens array consisting of a plurality of lenses, one lens for each VCSEL. The micro-lens array serves to focus and direct the beams from the VCSEL array to a DOE. The DOE forms the beams into any of a variety of light patterns which in turn enable 3-D imaging.

In instances, it can be of advantage to produce two different kinds of light distributions, e.g., when illuminating a scene. For example, two different kinds of structured light can be subsequently emitted from an illumination module. Or, in another example, structured light and diffuse light can be alternatingly emitted from an illumination module.

For example, in a first mode, the illumination module emits a first light distribution, and in a second mode, the illumination module emits a second light distribution, which is different from the first light distribution. And, e.g., in the first mode, distances to objects in the scene are determined based on the light having the first light distribution, whereas in the second mode, distances to objects in the scene are determined based on the light having the second light distribution. Or light is emitted in the second mode for another purpose.

An example of an advantage of a version of the invention is to provide a particularly versatile illumination module.

Another example of an advantage of a version of the invention is to provide an illumination module which is particularly shallow in the direction parallel to the direction of light emission.

Another example of an advantage of a version of the invention is to provide an illumination module which requires a particularly small number of constituents only.

Another example of an advantage of a version of the invention is to provide an illumination module which can provide a good contrast over a particularly large range of distances from the illumination module.

Another example of an advantage of a version of the invention is to provide an illumination module which can create particularly high contrast patterns.

Another example of an advantage of a version of the invention is to provide an illumination module operable to produce light of particularly high intensity, in particular when considered relative to the intensity of the light initially produced within the illumination module.

Another example of an advantage of a version of the invention is to provide an illumination module which can produce relatively simple light patterns.

Another example of an advantage of a version of the invention is to provide an illumination module which can produce relatively complicated light patterns.

Another example of an advantage of a version of the invention is to provide an illumination module which can be manufactured with relatively loose alignment tolerances.

Another example of an advantage of a version of the invention is to provide an illumination module which has a good manufacturability.

Another example of an advantage of a version of the invention is to provide an illumination module which can be manufactured with relatively high yield.

Another example of an advantage of a version of the invention is to provide an apparatus for optically determining distances which is particularly versatile and/or which is particularly shallow and/or which shows or profits from another one or more of the above-mentioned advantages.

Another example of an advantage of a version of the invention is to provide an apparatus for optically determining distances which can cope with a wide range of properties of objects and/or scenes.

Another example of an advantage of a version of the invention is to provide a method for illuminating a scene which is particularly versatile and/or which shows or profits from another one or more of the above-mentioned advantages.

Further objects and various advantages emerge from the description and embodiments below.

One of more of these objects are at least partially achieved in some implementations of apparatuses and/or methods described in this disclosure.

The present inventors have discovered that for certain selections of a lens pitch P of a microlens array (MLA) and of a distance D of the MLA to a light source illuminating the MLA—which we want to refer to as "illuminating unit"—, a contrast in structured light thereby produced is particularly strong, wherein the selection also depends on the wavelength of the light emitted by the illuminating unit. Accordingly, in those specific cases, patterns of particularly high contrast can be projected onto a scene.

The inventor's findings show some analogies to an optical effect discovered by Ernst Lau in 1948 ("Lau Effect"). The Lau Effect is described, e.g., in a paper by J. Jahns and A. W. Lohmann published in March 1979 in "OPTICS COMMUNICATIONS", Volume 28, number 3, titled "THE LAU EFFECT (A DIFFRACTION EXPERIMENT WITHIN COHERENT ILLUMINATION)". Lau's original experimental setup comprises an extended white light source illuminating a first grating behind which another grating is present which has the same slit separation as the first grating, and finally a converging lens images the light exiting the second grating into an observation plane. Lau has been able to observe fringe patterns for the case that the following equation has been met:

$$z0 = n \cdot d^2/2\lambda, (n=1, 2, 3, 4, \ldots) \text{ wherein}$$

z0 is the distance between the two gratings, d is the grating constant of the gratings (slit separation), and $\lambda$ designates a wavelength emitted by the light source, namely the wavelength of the light forming the observed fringe pattern.

Despite the significant differences from the present invention, understanding the Lau Effect can aid, to some extent, in understanding the functioning of the illumination modules and techniques of the present invention.

Another, but rather well-known, optical effect is an effect in coherent optics called Talbot Effect (or "Talbot self-imaging") discovered in 1836 by Henry Fox Talbot. The Talbot Effect is also described in the above-mentioned paper by J. Jahns and A. W. Lohmann. While the Lau Effect and the Talbot Effect can both be considered to relate to self-imaging of a grating, they differ at least in that Talbot described using a monochromoatic point light source (instead of the extended white light source employed by Lau) and in that Lau places two gratings behind on another, whereas Talbot uses a single grating only.

Talbot had discovered that behind the grating illuminated by the monochromatic light source, interference patterns are observable in planes which are aligned parallel to the grating and which are at specific distances from the grating. Those specific distances behind the grating are $$2d^2/\lambda,$$

and integer multiples thereof, wherein d designates the grating constant of the grating and $\lambda$ the wavelength of the monochromatic light source.

The present inventors discovered that particularly high contrast can be achieved if apertures of light sources of the illuminating unit are in a common plane, which we refet to as an emission plane.

The present inventors also have recognized, that particularly high contrast can be achieved if the illuminating unit is a periodic light source.

Furthermore, the inventors noted that some modifications can be applied to an illumination module which make possible to create, by means of one and the same illumination module, two or more different light distributions, e.g., wherein these different light distributions can be of strongly different character, e.g., one can represent structured light, the other diffuse light, or wherein the light distributions are two different high-contrast structured light patterns.

A corresponding illumination module proposed by the inventors can be described as an illumination module, e.g., an illumination module for emitting light, which is operable in at least two different modes. E.g., it can be operable at least in a first mode and in a second mode. In each of the modes, e.g., the emitted light can have a different light distribution, such as a different light intensity distribution such as a different angular light intensity distribution. The module includes a mode selector for selecting in which one of the modes the module operates and includes a microlens array including a multitude of transmissive or reflective microlenses which are regularly arranged at a lens pitch P;

an illuminating unit for illuminating the microlens array.

E.g., the illumination module can include an optical arrangement including the microlens array and the illuminating unit. The illuminating unit includes a first array of light sources (LSA) operable to emit light of a first wavelength L1 each and having an aperture each. The apertures are located in a common emission plane which is located at a distance D from the microlens array.

In a first one of the modes, for the lens pitch P, the distance D and the wavelength L1 applies $$P^2 = 2 \cdot L1 \cdot D/N$$

wherein N is an integer with N≥1.

The fulfillment of this special condition which interlinks the lens pitch P, the distance D and the wavelength L1 can result in a particularly high contrast in the emitted light when operating the illumination module in the first mode. The light emitted under this condition in the first mode can be structured light and provide a patterned illumination, respectively.

For small N, e.g., N≤8, in particular N≤5, the distance D is relatively small such that the illumination module and/or an optical arrangement included therein can be rather shallow. As further discovered by the present inventors, that the contrast achievable is apparently very high for such low N. In some experiments, N in the range of 1 to 4 can provide very good contrast, in particular N=2.

The illumination module can also be considered a module for producing patterned illumination.

The illumination module can also be used for illuminating a scene and, accordingly, be considered a module for illuminating a scene.

In some embodiments, the illumination module has the ability to produce light having different distributions, such that the module can in these cases also be considered a module for selectably producing light having (at least two) different light distributions.

The apertures do not need to be separable from the light sources. E.g., for a semiconductur laser, the active area from which the light is emitted establishes the aperture.

The apertures are mentioned mainly for the reason that by them, the location of the light emission is defined and thus, they make possible to define the distance D from the MLA.

In some embodiments, in the first mode, each of the light sources is arranged to illuminate a respective subset of the multitude of microlenses, and each of the subsets includes a plurality of neighboring microlenses, such that light from each particular one of the light sources passes through different ones of the microlenses in the respective subset so as to produce an interference pattern.

In some embodiments, the mode selector is operable to repeatedly, e.g., periodically, switch operation of the illumination module from the first into the second mode and back.

In some embodiments, the mode selector includes an actuator for changing a relative orientation in space of the microlens array with respect to the illuminating unit. Accordingly, in the first mode, the MLA and the illuminating unit have a first (relative) orientation, whereas they have a different, second (relative) orientation in the second mode.

In some embodiments with the actuator, in the first and in the second mode, the illuminating unit illuminates the MLA with light of wavelength L1. However it is alternatively also possible that light of a different wavelength L2 is emitted by the illuminating unit in the second mode.

In some embodiments with the actuator, the first array of light sources (LSA) includes light sources which are regularly arranged at a pitch Q1 (light source pitch Q1) which is equal to lens pitch P of the microlenses (P=Q1). And it can be provided that in the first mode, both pitches P and Q1 are distances of microlenses and of light sources, respectively, positioned along lines which are parallel to each other which can correspond to a laterally parallel alignment of LSA and MLA.

In some embodiments, the actuator includes a coil, e.g., a voice coil.

In some embodiments, the actuator includes a piezoelectric element.

By the coil and the piezoelectric element, respectively, the LSA can be moved relative to the MLA.

In some embodiments. the actuator is an actuator for changing the distance D. Thus, e.g., in the second mode, the equation depicted above does not apply (i.e. is not fulfilled by any integer N); or it is fulfilled by a different integer N than in case of the first mode.

For example, when the equation depicted above does not apply in the second mode, a contrast of the second light distribution can be lower than a contrast of the first light distribution. E.g., while there may be pronounced intensity peaks in the emitted light in the first mode, there may be a more diffuse light distribution in the second mode.

E.g., while changing the distance D, it can be provided that in the first and in the second mode, both pitches P and Q1 are distances of microlenses and of light sources, respectively, positioned along lines which are parallel to each other. This can correspond to a laterally parallel alignment of LSA and MLA.

In some embodiments, the actuator is an actuator for changing a rotational orientation about an axis perpendicular to the common emission plane of the microlens array with respect to the first array of light sources.

It can be provided in instances, that while having different rotational orientations in the first and in the second mode, the above equation applies in both, the first and the second mode. And still, while there may be pronounced intensity peaks in the emitted light in the first mode, there may be a more diffuse light distribution in the second mode. For example, the first array of light sources (LSA) can include light sources which are regularly arranged at a pitch Q1 (light source pitch Q1) which is equal to lens pitch P of the microlenses, and in the first mode, both pitches P and Q1 are distances of microlenses and of light sources, respectively, positioned along lines which are parallel to each other (which can correspond to a laterally parallel alignment of LSA and MLA); whereas in the second mode, lines along which microlenses and light sources, respectively, are positioned at pitches P and Q1, respectively, are at an angle such as forming an angle of at least 5° or of at least 10° (can correspond to an angled alignment of LSA and MLA). A contrast in the emitted light can be higher in the first mode than in the second mode, because such a laterally parallel alignment of MLA and LSA can provide particularly high contrast whereas in the angled orientation, a lower contrast can be achievable.

In some embodiments, the illuminating unit includes a second array of light sources which are operable to emit light each and have an aperture each. And the mode selector includes a control unit for controlling a ratio of an intensity of light emitted from the first array of light sources and an intensity of light emitted from the second array of light sources.

In some embodiments with the second array of light sources, the control unit includes a switching unit for turning on the light sources of the second array in the second mode and turning off the light sources of the second array in the first mode. Furthermore, it can optionally be provided that the switching unit is operated to turn on the light sources of the first array in the first mode and to turn off the light sources of the first array in the second mode.

Accordingly, in some embodiments, in the first mode, the MLA is illuminated with light from the first array of light sources only, and in the second mode, the MLA is illuminated with light from the second array of light sources only.

In some embodiments with the second array of light sources, the apertures of the light sources of the second array can be located in a common emission plane (which can be equal to or different from—but optionally parallel to—the common emission plane of light emitters of the first array of light emitters).

The first and second arrays of light sources can distinguish, e.g, in one or more of the wavelength of the emitted light, the spatial arrangement of the respective light sources, such as in their respective light source pitches.

In some embodiments, the light sources of the second array are operable to emit light of a second wavelength L2 each, wherein the second wavelength L2 is different from the first wavelengh L1.

Therein, it can be provided that the apertures of the light sources of the second array of light sources are arranged in the same common emission plane as the apertures of the light sources of the first array of light emitters are, i.e. at a distance D from the microlens array. As another option, it can be provided that the equation $$P^2 = 2 \cdot L2 \cdot D/N$$

does not apply for any integer N with N≥1. Thus, in this case, the condition for particularly strong contrast in the emitted light is fulfilled in the first mode, but not fulfilled in the second mode.

In some embodiments with the second array of light sources, the light emitters of the first array of light sources are regularly arranged at a light source pitch Q1, wherein optionally P=Q1 applies, and wherein an axis along which the microlenses are arranged at the pitch P is aligned parallel to an axis along which the light sources of the first array are arranged at the pitch Q1, and wherein the light emitters of the second array of light sources are irregularly arranged; or at least one of regularly arranged at a light source pitch Q2, wherein P≠Q2;

regularly arranged at a light source pitch Q2 (which can be equal to or different from pitch Q1), wherein an axis along which the microlenses are arranged at the pitch P is aligned at an angle (such as at least 5° or at least 10°) with respect to an axis along which the light sources of the second array are arranged at the pitch Q2.

In some embodiments, the first and second arrays of light sources occupy one and the same space. E.g., the first and the second arrays of light sources are mutually superimposed arrays of light sources. In other words, the light emitters of the first array of light emitters and the light emitters of the second array of light emitters are interspersed or interlacing.

In other embodiments with the second array of light sources, the first array of light sources occupies a space separate from a space occupied by the second array of light sources. E.g., the second array of light sources is arranged aside the first array of light sources (at a distance; or abutting each other).

In the second mode, the contrast in the emitted light can be lower than in the first mode.

In some embodiments, the light distribution in the second mode is more diffuse than the light distribution in the first mode.

The emission plane of the first and, if present of the second array of light sources can be aligned parallel to the microlens array.

The wavelength L1 is a wavelength of light emitted by the light sources of the first array. In case the light sources are lasers, it is simply the (medium) wavelength of the emitted laser radiation. In case of light sources emitting a mixture of wavelengths, wavelength L1 can, in principle, be any of the emitted wavelengths. But in any event, a particularly good contrast is present for those wavelengths L1 for which the above-cited equation is fulfilled, while other wavelengths superimpose patterns created by wavelengths L1—which usually results in a blurring of the patterns at wavelengths L1.

Therefore, wavelengths L1 will typically be a peak wavelength in a wavelengths spectrum of the respective light source.

Wavelength L1 may in particular be in an invisible range of light, e.g., in the infrared light range.

Typically, all the microlenses of the multitude of microlenses are congeneric microlenses.

Lens pitches P can amount to between 5 μm and 250 μm, e.g., to between 10 μm and 150 μm.

In some embodiments, all the light sources of the first array of light sources are congeneric light sources.

In some embodiments, all the light sources of the second array of light sources are congeneric light sources.

As described above, the microlenses can be transmissive or reflective.

Transmissive microlenses are transparent to at least a portion of the light emitted from the illuminating unit; accordingly, light emitted from the illuminating unit may propagate, at least in part, through the microlenses. The transmissive microlenses can be diffractive and/or refractive microlenses. For example, the transmissive microlenses may be athermalized microlenses or other hybrid lenses.

Reflective microlenses reflect at least a portion of the light emitted from the illuminating unit. They can also be understood as structured (and thus not-flat) micromirrors, e.g., curved micromirrors. In case of reflective microlenses, the microlens array (MLA) can thus be considered a micromirror array. The microlenses/micromirrors are, however, usually not individually movable and typically in a fixed position with respect to the rest of the microlens array/micromirror array. Each of the reflective microlenses may have a surface which is smooth and curved (like a refractive lens) and/or may be structured with diffractive structures (like a transparent diffractive lens).

In some embodiments, the microlenses are transmissive refractive microlenses.

In some embodiments, the microlenses are collecting lenses (converging lenses), e.g., convex lenses.

In other embodiments, the microlenses are dispersing lenses, e.g., concave lenses.

A lens aperture of the microlenses may be circular, but may also be (non-circularly) elliptical. And also polygonal lens apertures or still other lens aperture geometries are possible, e.g., rectangular, in particular square ones, hexagonal ones or others. By choosing a suitable lens aperture geometry, it is possible to optimize (maximize) the percentage of light transmitted by and reflected by the MLA to finally contribute to the produced emitted light The fact that in the first mode the structured light originates from an interference pattern created by interference of light propagating from different ones of the microlenses makes possible that the contrast of the emitted light remains substantially constant over a wide range of distances from the MLA, e.g., in the whole far field, which is at least from, e.g., 5 cm or 10 cm to infinity. The herein described illumination module does not require a patterned slide for achieving a patterned illumination. And also an imaging lens (or even a multi-lens imaging system) may be dispensed with.

The microlenses, i.e. their shape, define the field of view of the illumination module and/or of the optical arrangement, i.e. the angular range into which the (structured) light is (predominantly) emitted by the illumination module and/or by the optical arrangement (absence of additional optical components influencing the path of light emitted from the optical arrangement assumed).

Therefore, for various applications, it can be advantageous to provide that the microlenses as aspherical lenses. For example, the microlenses can be structured for creating a rectangular envelope for the structured light. E.g., the microlenses can have a focal length f1 along a first axis perpendicular to an optical axis of the microlens which is smaller than a focal length f2 along a second axis perpendicular to an optical axis of the microlens and perpendicular to the first axis.

Typically, the MLA is a two-dimensional MLA. But in some embodiments, the MLA is a one-dimensional MLA. In the latter case, the microlenses are arranged along a line; cylindrical lenses can in this case be particularly suitable.

In case of a two-dimensional MLA, there may be two lens pitches which may differ from each other, namely one pitch for each of two different directions. In case of rectangular lens arrangements, the two directions are mutually perpendicular, and for hexagonal arrangements, the directions enclose an angle of 60°. However, in some embodiments with a two-dimensional MLA, those two lens pitches are identical.

In some embodiments, the first array of light sources (LSA) includes light sources which are regularly arranged at a pitch Q1 (light source pitch Q1).

Light source pitches Q1 are typically between 5 µm and 250 µm, more particularly between 10 µm and 150 µm.

In some embodiments, the second array of light sources includes light sources which are regularly arranged at a pitch Q2 (light source pitch Q2).

Light source pitches Q2 are typically between 5 µm and 250 µm, more particularly between 10 µm and 150 µm.

In some embodiments, the LSA is a two-dimensional LSA. But in other embodiments, the LSA is a one-dimensional LSA. In the latter case, the light sources are arranged along a line.

In some embodiments, the second array of light sources is a two-dimensional array of light sources. But in other embodiments, the second array of light sources is a one-dimensional array of light sources. In the latter case, the light sources are arranged along a line.

In some embodiments, the light sources of the LSA are arranged on a common plate-shaped substrate, wherein an emission direction of the light sources (and thus the optical axis) is perpendicular to the plate described by the substrate.

In some embodiments, the light sources of the second array of light sources are arranged on a common plate-shaped substrate, wherein an emission direction of the light sources (and thus the optical axis) is perpendicular to the plate described by the substrate.

Optionally, the light sources of the first array and those of the second array of light sources are arranged on one and the same common plate-shaped substrate.

In principle, pitch Q1 (and optionally also pitch Q2) may be selected independent of lens pitch P. However, in case that both pitches P and Q1 (and Q2, respectively) are distances of microlenses and of light sources, respectively, positioned along lines which are parallel to each other, it turned out that particularly high contrasts in the light emitted in the first mode (and in the second mode, respectively) can be achieved if P=Q1 (P=Q2, respectively) applies.

Good contrasts are also obtainable in case pP=qQ1 with p and q being integers of at least one (p≥1, q≥1) with no common factor. The inventors determined that in this case, illumination patterns can be produced in the first mode which have an increased complexity, in particular an enlarged and more complex unit cell (with respect to the case of P=Q1).

However, relatively high values of p and q tend to result in decreased contrast in the structured light, such that p≤8 and q≤8 is often favorable.

This applies analogously also to the second array of light sources and Q2.

In some embodiments, the microlenses of the MLA are arranged on a rectangular grid, or even on a square grid, but also other geometries are possible, e.g., a hexagonal periodic arrangement.

In some embodiments, the light sources of the LSA are arranged on a rectangular grid, or even on a square grid, but also other geometries are possible, e.g., a hexagonal periodic arrangement. The same can apply to the second array of light sources.

The inventors discovered that the provision of an MLA and an LSA both having regular arrangements of the same geometry which are aligned parallel to each other may make possible to achieve particularly high contrasts in the first mode, e.g., the provision of rectangular arrangements of the same aspect ratio for both, the MLA and the LSA, corresponding sides of the rectangles of the MLA and of the LSA being aligned parallel to each other.

Similarly, mutually parallel arranged hexagonal (or other) geometries of the microlens array and of the first array of light sources tend to provide increased contrast in the first mode.

In particular, for the above-mentioned case of pP1=qQ1 (with integers p, q having no common factor), useful illumination patterns having a large unit cell and a large periodicity can be obtained. Analogously, the same holds for the case that there are two potentially different pitches (P1, P2) of the lenses along different axes and two potentially different pitches (Q1, Q2) of the light sources along different axes, at least if it is provided that p1P1=q1Q1 and p2P2=q2Q2, with integers p1, q1 having no common factor and integers p2, q2 having no common factor; and wherein as a further option, the axis along which the lenses have pitch P1 is aligned parallel to the axis along which the light sources have pitch Q1, and wherein the axis along which the lenses have pitch P2 is aligned parallel to the axis along which the light sources have pitch Q2.

The inventors determined that the position of potential (i.e. possible) light intensity maxima in the emitted light in the first mode is determined by the periodicity (or periodicities) of the MLA, while the periodicity (or periodicities) of the LSA can be used for adjusting relative intensities at said positions of potential light intensity maxima in the emitted light.

In some embodiments, the illuminating unit is operable to emit spatially incoherent light in the first mode. It is, alternatively, also possible to provide that the illuminating unit emits spatially coherent light first mode.

For example, the light sources of the first array can be light generators which are separate from each other (and, altogether, produce spatially incoherent light in the first mode)—in contrast, e.g., to the provision of only one light generator such as one laser, plus a grating, the laser illuminating the grating and the light emitted through slits of the grating constituting the light sources (which results in spatially coherent light being emitted from the illuminating unit).

The above can analogously apply to the second array of light sources and the second mode, too.

In some embodiments, the illuminating unit includes an array of VCSELs, i.e. of vertical-cavity surface-emitting lasers. An array of VCSELs can make possible the emission of spatially incoherent light at very high intensity. In particular, it can be provided that the illuminating unit is an array of VCSELs and/or that the first array of light sources.

The provision of VCSELs as light emitters can make possible the design of illumination modules which are very small-sized in the vertical direction, i.e. along the optical axis, along the emission direction. And small light source pitches are also easier to realize using VCSEL than using edge-emitting lasers.

In some embodiments, an emission direction of the VCSELs of the array of VCSELs is parallel to an optical axis of the MLA.

In some embodiments, the light emitted from the illuminating unit in the first mode and/or in the second mode is a temporally modulated light. It can be useful, e.g., for some distance determining techniques, to emit light from the illumination module having an intensity which varies with time, e.g., an intensity which periodically changes between zero and a non-zero value.

In some embodiments, a light path between the illuminating unit and the MLA is free of additional optical elements, at least free of optical elements having optical power.

In some embodiments, a reference plane at the MLA for determination of the distance D is referred to as lens plane, wherein the lens plane includes peripheral points of the microlenses. In case not all peripheral points of the microlenses are in the same plane, the lens plane is defined as that plane including peripheral points of the microlenses which is farest away from the illuminating unit.

In practice, the distances D can be so much larger than a vertical extension (extension along the optical axis) of the microlenses that it is sufficiently precise to define the lens plane as the plane in which the microlenses are located.

The distance D can be determined in a direction perpendicular to the MLA—which in particular can also be a direction perpendicular to the above-mentioned emission plane. This can be the case when the distance D to be used in the above equation is identical with the geometrical distance between the apertures (emission plane) and MLA. In other words, when the optical path length of the light coincides with the length of a direct straight line connection between aperture and MLA. However, this is not necessarily the case. As will be explained further below, there are embodiments in which the optical path length (which is to be used as distance D in the equations above) differs therefrom.

In some embodiments, each of the light sources is structured and arranged to illuminate a subset of said multitude of microlenses, the subset including a plurality of neighboring microlenses. This way, it may be ensured that light from a single one of the first light sources results in light propagating from several (different) ones of the microlenses, such that an interference pattern evolves at least in the first mode. E.g., each microlens may be illuminated by at least two or rather at least ten of the light sources of the first array of light sources (and optionally also of a second array of light sources).

And moreover, it can be provided that subsets of microlenses illuminated by neighboring ones of the light sources are overlapping, i.e. the subset of microlenses illuminated by a first light source and the subset of microlenses illuminated by a second light source neighboring the first light source have at least one microlens in common. Such an overlap on the MLA of light emitted from neighboring light sources can, in particular when lasers such as VCSELs are used as light sources, reduce or even eliminate speckle formation, e.g., in a pattern produced by the light emitted in the first mode (and optionally also in the second mode).

In some embodiments, each of the light sources (at least of the first array) has an emission cone of at least 5° or rather at least 10° average opening angle ("average" for the case that the emission cones are not rotationally symmetric).

It is also possible to produce in the first mode and optionally also in the second mode emitted light producing more complex patterns, e.g., by providing that the illumination module (and/or the optical arrangement) includes an additional optical component. Such an additional optical component can include, e.g., at least one prism. The additional optical component may be, e.g., an array of passive optical components, e.g., a prism array.

The additional optical component can include, e.g., a diffractive optical component. In instances, the diffractive optical component can be structured and arranged to create at least two outgoing light rays from each incoming light ray exiting the microlens array.

In some embodiments, the MLA is arranged (on the light path) between the LSA and the additional optical component.

The described imaging modules can also be considered pattern projectors or structured light projectors or optical projection systems or optical apparatuses for projecting a light pattern into a field of view (or into a scene).

Illumination modules including at least one (first) array of light sources have been described, but it is also possible to operate illumination modules which include merely a single light source. For example, the illumination module can be an illumination module (e.g., an illumination module for emitting light) which is operable in at least two different modes (e.g., wherein in each of the modes, the emitted light has a different light distribution). And the module comprises:

a microlens array comprising a multitude of transmissive or reflective microlenses which are regularly arranged at a lens pitch P;

an illuminating unit for illuminating the microlens array; and a mode selector for selecting in which one of the modes the module operates.

In instances, the microlens array and the illuminating unit can be included in an optical arrangement included in the illumination module.

And the illuminating unit includes no more than a single light source for emitting light of a first wavelength L1 and has an aperture which is located at a distance D from the microlens array, wherein in a first one of the modes, $$P^2 = 2 \cdot L1 \cdot D / N$$

and wherein N is an integer with N≥1.

The MLA can be any MLA described in the instant disclosure, and further MLAs can be included, too.

It is possible to have the MLA illuminated by the single light source only.

The light source can be characterized by having no more than a single aperture (through which the light is emitted).

The aperture can be located in an emission plane (from which distance D is determined).

The light source can be structured and arranged to illuminate a range of the microlenses. The range can be a subset or can include all microlenses of the MLA.

In some embodiments, the light source is arranged to illuminate a range of the multitude of microlenses including a plurality of neighboring microlenses, such that light from the light source passes through different ones of the microlenses so as to produce an interference pattern.

The structured light can originate from the interference pattern.

In some embodiments, the light source is a laser.

In some embodiments, the light source is a vertical-cavity surface-emitting laser.

In some embodiments, the light source is an LED.

In some embodiments, the light source is a superluminiscent light emitting diode.

The above examples correspond to implementations in which an optical path length of the light path along which the light propagates from the aperture to the MLA is identical with a geometrical distance from the aperture to the MLA. However, as already announced before, this is not necessarily the case. In some implementations, said geometrical distance is different from the optical path length; and in general, the distance D to be used in the equations above is said optical path length.

E.g., in some embodiments, some material having a refractive index different from 1 may be present along the optical path. And/or the light path along which the light propagates from the aperture to the MLA can be a folded light path.

Accordingly, we disclose an illumination module (which can be, e.g., an illumination module for emitting light) which is operable in at least two different modes. For example, in each of the modes, the emitted light has a different light distribution. The module comprises:

- a microlens array comprising a multitude of transmissive or reflective microlenses which are regularly arranged at a lens pitch P;
- an illuminating unit for illuminating the microlens array; and
- a mode selector for selecting in which one of the modes the module operates.

In instances, the microlens array and the illuminating unit are comprised in an optical arrangement comprised in the illumination module.

The illuminating unit comprises one or more light sources operable to emit light of a first wavelength L1 each and having an aperture each, wherein for each of the one or more light sources, an optical path length for light emitted from the respective light source from the respective aperture to the microlens array amounts to one and the same distance D, wherein in a first one of the modes, $$P^2 = 2 \cdot L1 \cdot D/N$$

and wherein N is an integer with N≥1.

In some embodiments, the light emitted from each of the one or more light sources propagates from the respective aperture to the microlens array along a light path, wherein at least a portion of the light path is running through a material having a refractive index different from 1. E.g., the light can pass through a block of material. This way, the optical path length can be varied with respect to the geometrical length of the path along which the light travels.

In some embodiments, the illuminating unit comprises at least one reflective element, and the light emitted from each of the one or more light sources propagates from the respective aperture to the microlens array along a light path along which it is reflected at least once by the at least one reflective element. E.g., one or more mirrors can be comprised in the illuminating unit which reflect light propagating along the light path. This way, it is possible, e.g., to achieve great optical path lengths (and thus great distances D insertable in the equations above) even at a small geometrical distances between MLA and light source apertures.

Of course, the one or more light sources can comprise an array of light sources.

The various embodiments and features described above for the case where the optical path length is identical with the geometrical distance can, of course be applied also for the case that these two magnitudes differ from one another.

The invention can include an apparatus for optically determining distances. That apparatus includes an illumination module as herein described.

In some embodiments, the apparatus furthermore includes an image sensor for detecting light reflected from a scene illuminated by light emitted from the illumination module.

In some embodiments, the apparatus is operable to determine distances in at least two different ways, e.g., using at least two different techniques for determining distances, wherein the techniques can be optical techniques. These techniques can include one or more of, e.g., triangulation measurements, pattern recognition, time-of-flight measurements, stereo vision techniques.

For example, a first technique for determining distances is applied to data obtained from light reflected from the scene illuminated by light emitted from the illumination module in the first mode, whereas a second (different) technique for determining distances is applied to data obtained from light reflected from the scene illuminated by light emitted from the illumination module in the second mode. In both cases, the data can be obtained by the image sensor of the apparatus. Alternatively, the data can be obtained by means of another sensor of the apparatus in the first and/or in the second mode.

The invention can include a method for illuminating a scene which includes

- illuminating the scene with light emitted from an illumination module operated in a first mode;
- changing operation of the illumination module from the first mode to a second mode to subsequently illuminate the scene with light emitted from the illumination module operated in the second mode The changing the operation from one mode to another can be accomplished, e.g., by a mode selector of the module, cf. above for details.

For example, in each of the modes, the emitted light can have a different light distribution.

In the method, the illumination module can include (e.g., in an optical arrangement):

- a microlens array including a multitude of transmissive or reflective microlenses which are regularly arranged at a lens pitch P; and
- an illuminating unit for illuminating the microlens array, the illuminating unit including a first array of light sources having an aperture each.

In the first mode,

- the apertures are located in a common emission plane which is located at a distance D from the microlens array;
- the light sources of the first array of light sources are operated to emit light of a first wavelength L1 each and to illuminate the microlens array; and
- for the lens pitch P, the distance D and the wavelength L1 applies $$P^2 = 2 \cdot L1 \cdot D/N$$

wherein N is an integer with N≥1.

The illumination module can be an illumination module described in the present patent application.

In some embodiments, the method includes repeatedly, e.g., periodically, changing from one of the modes into another one of the modes, e.g., hence and forth between the first and the second mode.

In some embodiments, the changing operation of the illumination module from the first mode to the second mode includes changing a relative orientation in space of the microlens array with respect to the illuminating unit.

In some embodiments, the illuminating unit includes, in addition, a second array of light sources operable to emit light each, wherein in the second mode, the light sources of the second array of light sources are operated to illuminate the microlens array.

Further method embodiments can be inferred from the described illumination module embodiments.

Figure 3:
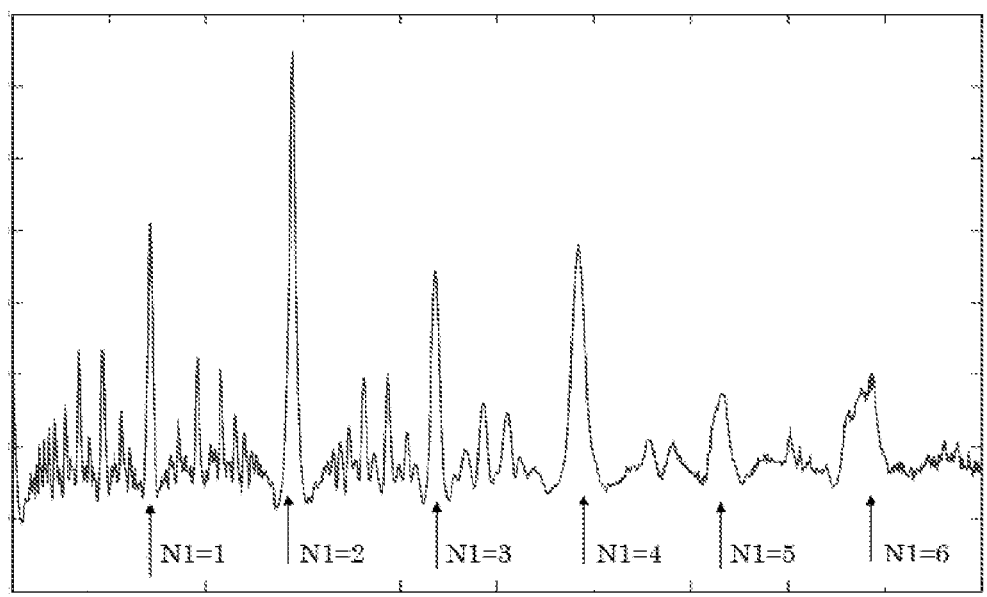
Figure 4:
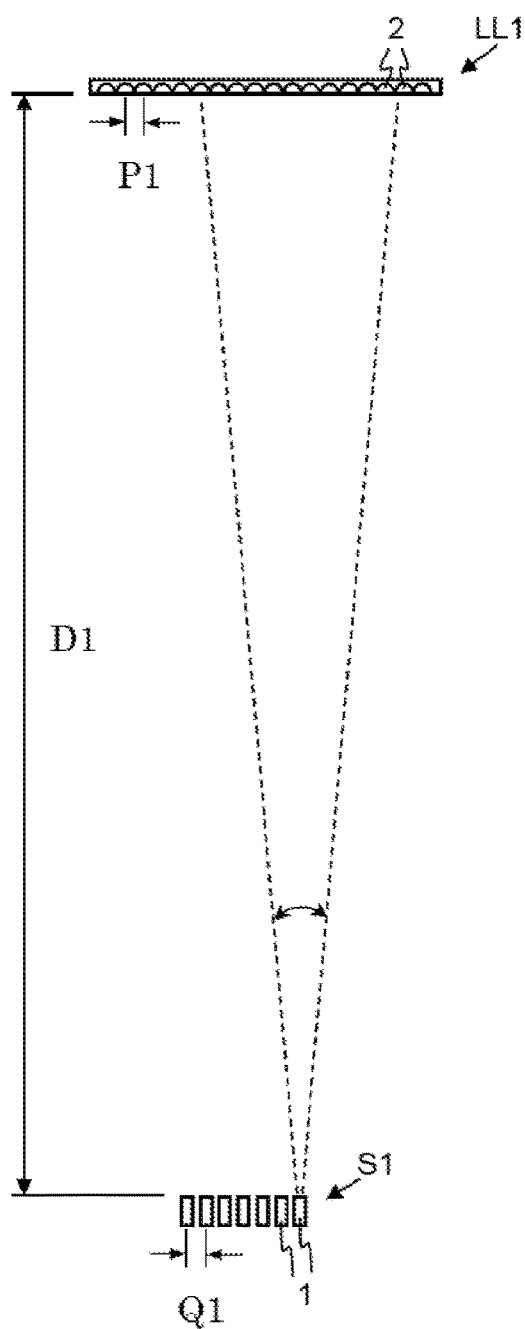
Figure 2:
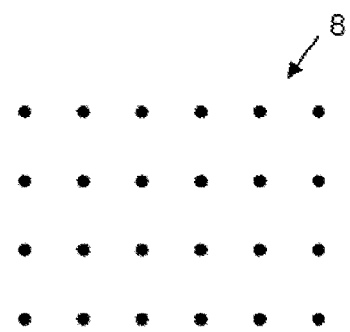
Figure 2A:
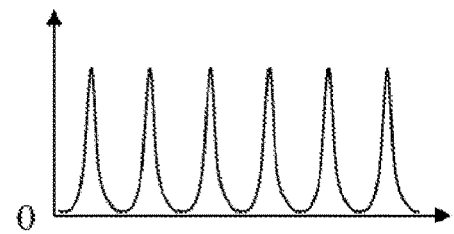
Figure 2B:
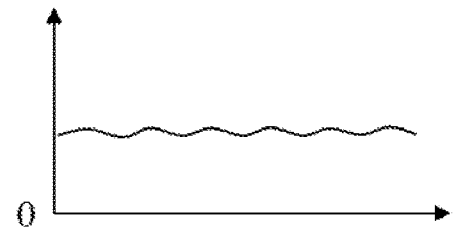
Figure 5A:
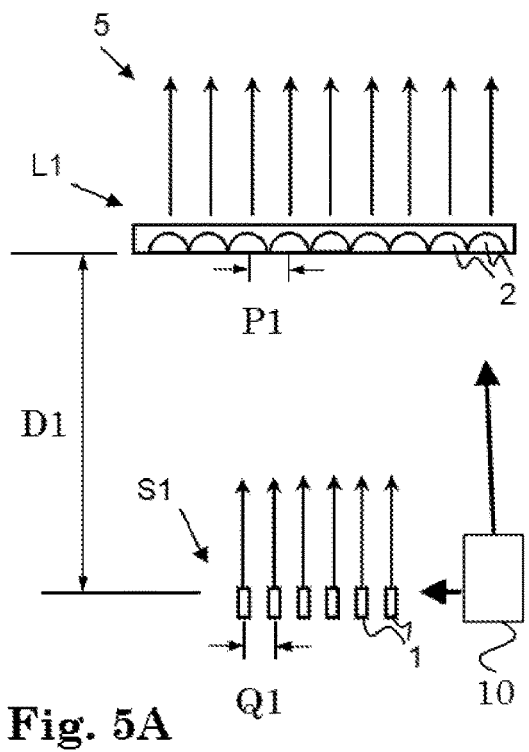
Figure 5B:
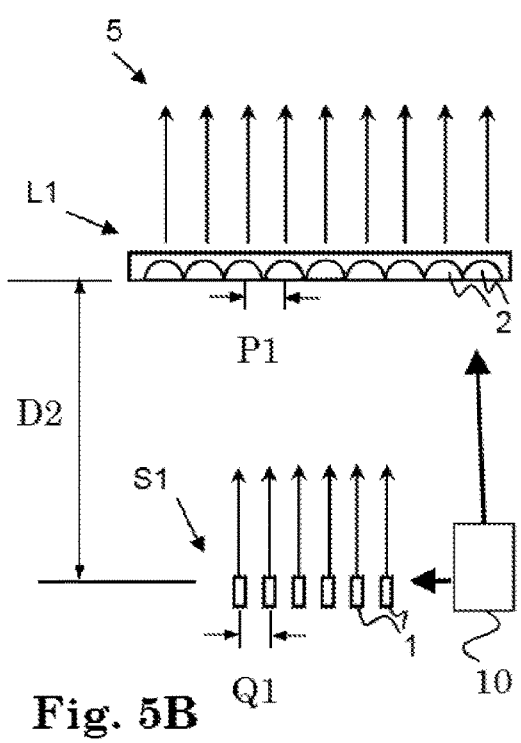
Figure 6A:
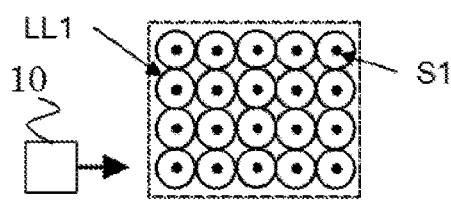
Figure 6B:
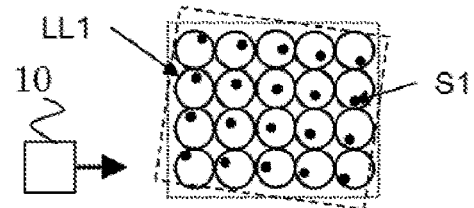
Figure 7A:
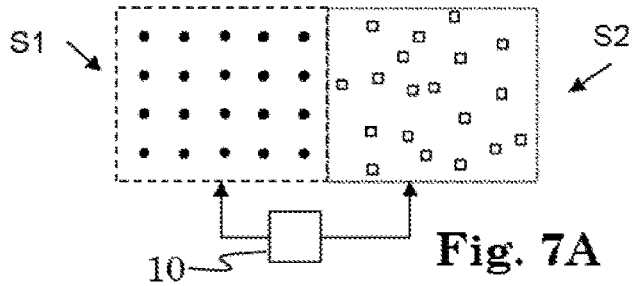
Figure 7B:
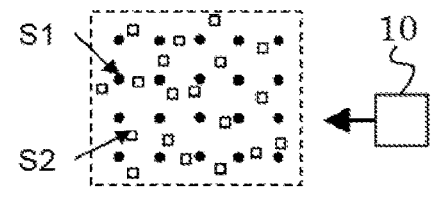
Figure 8A:
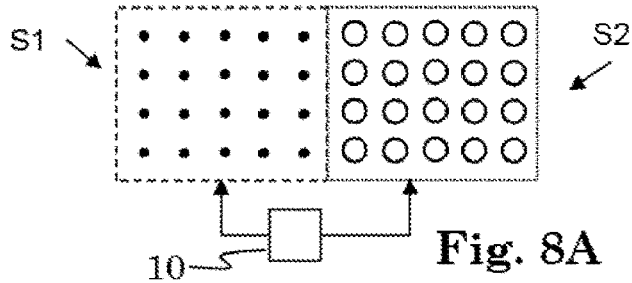
Figure 8B:
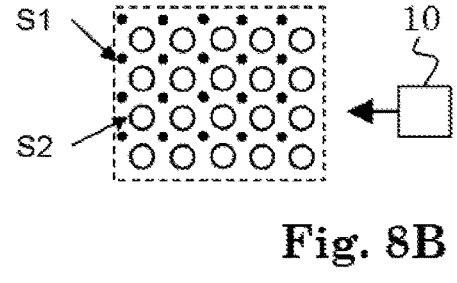
Figure 9:
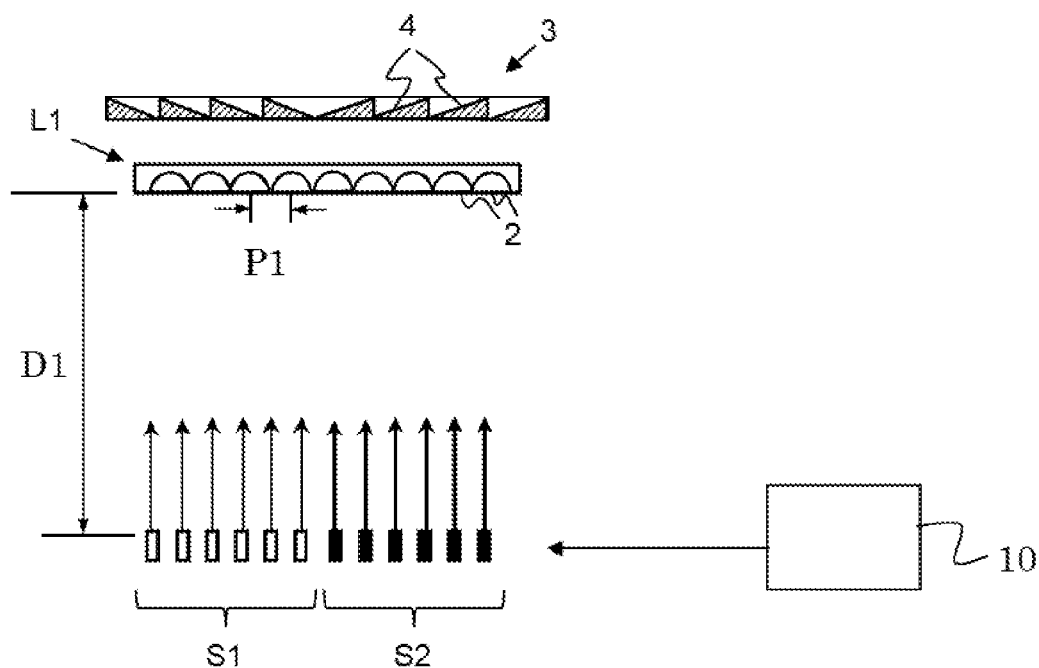
Figure 10:
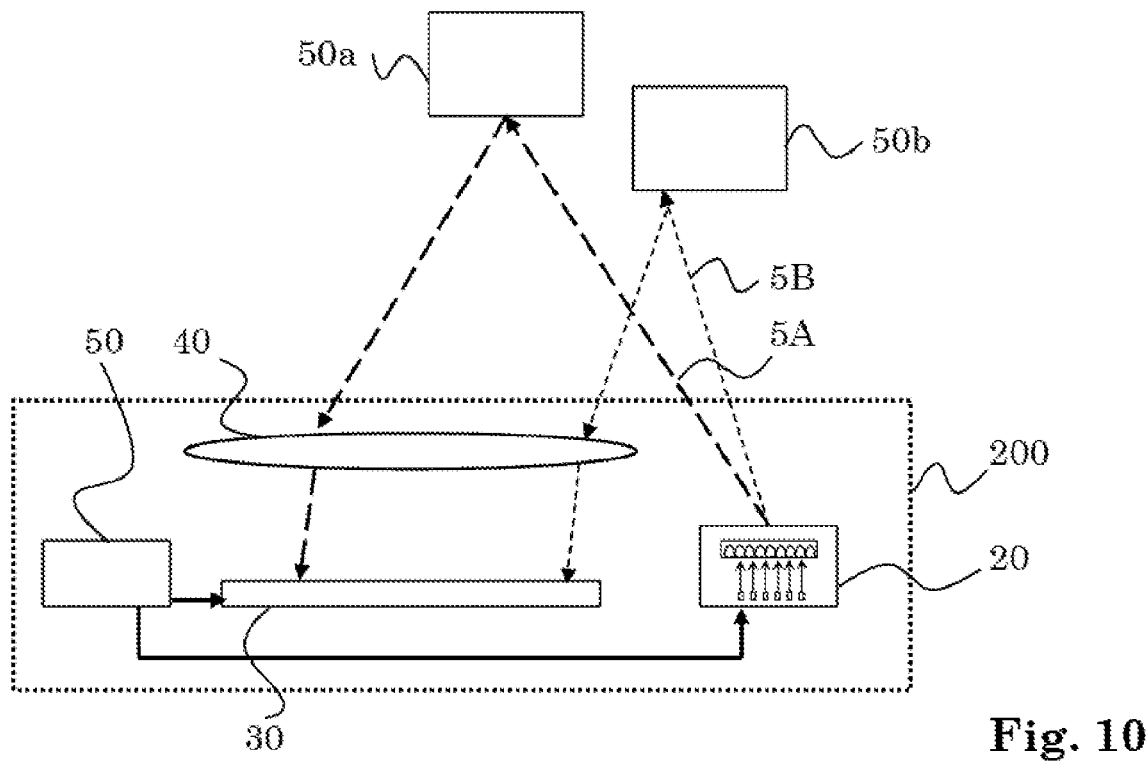

Below, the invention is described in more detail by means of examples and the included drawings. The figures show schematically:

FIG. 1 an illustration of an illumination module, in a side view;

FIG. 2 an illustration of a pattern created by the light emitted from the illumination module of FIG. 1 in a first mode of operation;

FIG. 2A a strongly schematized illustration of an intensity distribution along a line in the pattern of FIG. 2;

FIG. 2B a strongly schematized illustration of an intensity distribution along a line in a pattern similar to the one of FIG. 2, but in a second mode of operation;

FIG. 3 a graph illustrating contrast in patterns obtained for different numbers N1;

FIG. 4 an illustration of an illumination module, to scale, in a side view;

FIG. 5A an illustration of an illumination module including an actuator for changing a distance between MLA and LSA, in a first mode, in a side view;

FIG. 5B an illustration of the illumination module of FIG. 5A, in a second mode, in a side view;

FIG. 6A an illustration of an illumination module including an actuator for (laterally) rotating MLA vs. LSA, in a first mode, in a top view;

FIG. 6B an illustration of the illumination module of FIG. 6A, in a second mode, in a top view;

FIG. 7A an illustration in a top view of a detail of an illumination module including two arrays of light sources in which the light sources are differently arranged, wherein the arrays are aside each other;

FIG. 7B an illustration in a top view of a detail of an illumination module including two arrays of light sources in which the light sources are differently arranged, wherein the arrays are overlapping each other;

FIG. 8A an illustration in a top view of a detail of an illumination module including two arrays of light sources emitting light of different wavelengths, wherein the arrays are aside each other;

FIG. 8B an illustration in a top view of a detail of an illumination module including two arrays of light sources emitting light of different wavelengths, wherein the arrays are overlapping each other;

FIG. 9 an illustration of an illumination module with two arrays of light sources and with an additional optical component, in a side view;

FIG. 10 an illustration of an apparatus for optically determining distances, in a side view.

The described embodiments are meant as examples or for clarifying the invention and shall not limit the invention.

FIG. 1 shows a schematic illustration of an illumination module for emitting light 5, in a side view. At the same time, FIG. 1 shows a schematic illustration of an optical arrangement for producing light 5. Light 5 can be structured light.

The module (and the optical arrangement) includes a microlens array LL1 (MLA LL1) including a multitude of microlenses 2 which are regularly arranged at a pitch P1. In the illustrated example, the microlenses 2 are congeneric microlenses. The module also includes an illuminating unit by means of which MLA LL1 is illuminated. The illuminating unit comprises array S1 of light sources (LSA S1). LSA S1 includes a multitude of light sources 1 which are regularly arranged at a pitch Q1. In the illustrated example, the light sources 1 are congeneric light sources. The light emitted from the light sources 1 can travel on a light path to the MLA LL1 which is free of any intervening surface having optical power.

The module also includes a mode selector 10 by means of which it can be selected in which one of two or more modes of operation the module operates, wherein a light intensity distribution of the emitted light 5 is different in different modes.

In the illustrated case of FIG. 1 and also in other Figures, the microlenses 2 are transparent refractive semi-concave microlenses. However, the microlenses 2 may alternatively be concave microlenses or convex microlenses or semi-convex microlenses. And they may furthermore alternatively be diffractive microlenses or diffractive-and-refractive microlenses, the latter also being referred to as hybrid microlenses. And the microlenses 2 may also be reflective microlenses. In the latter case, the structured surface of the microlens reflects light impinging on it.

In the illustrated case of FIG. 1 and also in other Figures, only a small number of microlenses 2 is illustrated. However, in practice many more microlenses may be provided, and the same holds also for the relatively small number of illustrated light sources drawn.

LSA S1 can be, e.g., an array of VCSELs, such that each of the light sources 1 is a VCSEL.

Light sources 1 emit light of a wavelength L1 (not indicated in the Figures) into an emission cone each, as indicated in FIG. 1, wherein the cones may have a circular cross-section but do not need to have a circular cross-section. Opening angles of the cones are typically between 2° and 120° or rather between 5° and 25°, e.g., about 10°. The emission cones are not free from overlap, as can be seen in FIG. 1 (dashed lines). The emission cones overlap, typically at least for immediately adjacent light sources 1, and optionally rather, each microlens 2 is illuminated by at least 6 light sources 1.

Light sources 1 may, e.g., emit infrared light.

Each light source 1 illuminates several ones of the microlenses 2. E.g., a subset of at least two, e.g., of four or more such as of at least 20 microlenses 2 is illuminated by each of the light sources 1.

This way, interference between light emitted from a specific light source 1 but having passed through different ones of the microlenses 2 can interfer so as to produce an interference pattern. Light emitted from another one of the light sources 1 produces, in the same way, the same interference pattern, such that, in the far field, e.g., beyond 2 cm or beyond 5 cm after having interacted with MLA LL1, all the interference patterns superimpose. This way, the emitted light 5 produces a high-intensity interference pattern which can be used to illuminate a scene or be caught on a screen.

Manufacture of an module of the described kind is simplified by the fact that no precision lateral alignment of MLA LL1 and LSA S1 is necessary for producing high-contrast illumination patterns. The x-y-tolerance (shifts in a plane parallel to the MLA plane/emission plane) is very high; z tolerances (relating to the distance between the MLA and the illuminating unit) are not very delicate; and also rotational alignment requirements are not very high.

A distance between LSA S1 (and, more particularly the light sources 1 and their respective apertures, respectively) and MLA LL1 (and, more particularly the microlenses 2) is referred to as D1 (at least on the first mode of operation).

FIG. 2 is a schematic illustration of a pattern 8 created by light 5 produced by the module of FIG. 1, e.g., in the first mode. The pattern 8 is recorded in the far-field. The dark spots indicate locations of high light intensity, whereas white area indicates regions of low light intensity.

It turned out that for specific selections of pitches P1, wavelengths L1 and distances D1, a contrast present in such a pattern is particularly high, whereas for other distances, only much lower contrast is present in a created pattern.

A formula in which the decisive magnitudes P1, L1 and D1 are interconnected so as to obtain triplets P1, L1, D1 for which particularly sharp contrast in patterns 8 is obtained reads as follows:

$$(P1)^2 = 2*(L1)*(D1)/(N1).$$

Therein, N1 designates an integer which is at least 1. I.e. for N1=1 or 2 or 3 or 4, . . . , triplets P1, L1, D1 can be selected which fulfill the above equation, and thus, the parameters for an illumination module for high-contrast pattern generation are determined.

In the first mode of operation, the module operates to fulfill the equation and thus to produce a high-contrast light distribution and thus a high-contrast light pattern.

In the second mode of operation, another light distribution is produced which can fulfill the above equation, too, or, alternative, not fulfill the equation.

For example, the emitted light 5 exhibits a higher contrast and/or is less diffuse than the light distribution of the light 5 emitted in the second mode.

FIGS. 2A and 2B very schematically illustrate an intensity distribution along a line each, wherein the intensity is on the y-axis, and a space coordinate runs along the x-axis.

FIG. 2A very schematically illustrates an intensity distribution along a line of the pattern illustrated in FIG. 2, the line running through intensity maxima of the light pattern of FIG. 2. During operation in the first mode, in this case, the above equation is fulfilled, P1=Q1 applies, the LSA S1 is aligned parallel to the MLA LL1 (i.e. the plane defined by MLA LL1 is aligned parallel to the plane defined by LSA S1), and LSA S1 and the MLA LL1 are also laterally aligned parallel to each other, i.e. both pitches P1 and Q1 are distances of microlenses and of light sources, respectively, positioned along lines which are parallel to each other. The contrast of the produced light pattern is high (pronounced intensity maxima on low background).

In the second mode, an intensity distribution along a line of a pattern analogous to the one illustrated in FIG. 2 can look like illustrated in FIG. 2B. Disrupting the above equation and/or using a different arrangement of light sources 1 can lead to (pronouncedly) less contrast.

Some ways of accomplishing that the illumination module can emit, in the at least two modes, at least two different light distributions will be discussed further below.

FIG. 3 shows a graph illustrating contrast in patterns 8 from emitted light 5, obtained for different numbers N1, wherein in the graph of FIG. 3, N1 is a continuous positive number, assigned to the horizontal axis. Along the vertical axis, a magnitude indicative of the contrast obtained in a light pattern 8 is indicated.

As is obvious from FIG. 3 (cf. the small arrows), particularly high contrast is present if N1 is an integer. N1=2 promises highest contrast, and in the case of N1 being 1 or 3 or 4, also very high contrast patterns can be obtained. For higher integers N1, still a high contrast is obtained, which is clearly higher than contrast for non-integer numbers in between. However, illumination patterns may also be produced for non-integer factors instead of integer N, e.g., for 0.5 or 1.5.

If P1 and L1 are given (fixed), N1=1 results in a small value for D1 such that the optical arrangement and thus also the illumination module can be rather shallow, i.e. small in the direction of light emission. Cf. the equation above.

As can be inferred from FIG. 3 and the equation depicted above, a gradual variation of the distance D1 starting at one of the peaks (with an integer N1, and with the equation fulfilled) can result in a gradually decreasing contrast in the emitted light distribution. And similarly can a gradual variation of the wavelength L1 starting at one of the peaks (with an integer N1 and the equation fulfilled) result in a gradually decreasing contrast in the emitted light distribution.

FIG. 4 is an illustration to scale and in a side view, of an illuminating unit. FIG. 4 illustrates, e.g., the case of P1=Q1=50 μm for N1=2 and L1=833 nm. The far-field in which the pattern 8 can be observed and recorded is much too far away to be illustrated in FIG. 4.

LSA S1 does not have to, but may be a regular array. And it turned out that particularly high contrast patterns can be obtained when MLA LL1 and LSA S1 are mutually parallel arrays of the same geometry, wherein P1=Q1 applies. And still very high contrast patterns can be achieved if P1/Q1 amounts to 2 or 3 or 4 or to 3/2 or 4/3 or 5/2 or 5/4 or if Q1/P1 amounts to 2 or 3 or 4 or to 3/2 or 4/3 or 5/2 or 5/4. In fact, for p1P1=q1Q1 (with p1≥1 and q1≥1, p1 and q1 designating integers), illumination patterns can be produced which have an increased complexity, in particular illumination patterns which have a larger unit cell, and wherein the larger unit cell is repeated with a larger periodicity—than compared to the case P1=Q1.

MLA LL1 and/or LSA S1 may be one-dimensional (i.e. linear) arrays, but for many applications, MLA L1 and/or LSA S1 are two-dimensional (i.e. aerial) arrays.

FIGS. 5A and 5B are illustrations (in a side view) of an illumination module including an actuator for changing a distance between MLA LL1 and and LSA S1, which can constitute a mode selector 10 or can be included in a mode selector 10. The actuator can include, e.g., a piezoelectric element or a coil for accomplishing a change of said distance from a value D1 in the first mode (cf. FIG. 5A) to a value D2 in the second mode (cf. FIG. 5B) and, optionally, also back to D1, e.g., repeatedly.

For example, in the first mode, the above-mentioned equation can be fulfilled, resulting in a high-contrast pattern, while in the second mode, the equation (with D1 replaced by D2) is not fulfilled, .i.e. there exists no integer N1 such that the equation would apply; and thus, the light emitted from the illumination module can have a lower contrast.

FIGS. 6A and 6B are illustrations (in a top view) of an illumination module including an actuator for changing a rotational orientation of MLA LL1 versus LSA S1 about a vertical axis, i.e. about an axis perpendicular to the common emission plane from which the light sources emit light. In FIGS. 6A, 6B, the microlenses are symbolized by large open circles, and the light sources are symbolized by small black circles.

The actuator can constitute a mode selector 10 or can be included in a mode selector 10. The actuator can include, e.g., a piezoelectric element or a coil for accomplishing a rotation of MLA LL1 versus LSA S1 such that the relative rotational orientation of MLA LL1 and LSA S1 is changed by the mode selector when switching from the first mode to the second mode and vice versa. Like in all other embodiments, too, also here the mode selector can be operable to repeatedly, e.g., periodically, change between different modes such as between the first and the second mode, wherein also a third mode and still further modes can be arranged for.

For example, in the first mode, MLA LL1 and LSA S1 can have a laterally parallel mutual arrangement (like shown in FIG. 6A), whereas in the second mode, MLA LL1 and LSA S1 can have a laterally angled mutual arrangement (like shown in FIG. 6B).

It is possible therein that in both modes, the first mode and the second mode, the above-mentioned equation is fulfilled. However, in an alternative, the equation is fulfilled in the first, but not in the second mode.

The arrangement in the first mode (FIG. 6A) can result in a high-contrast pattern, while in the second mode (FIG. 6B), the emitted light can be more diffuse having less contrast and/or can produce a more complex pattern.

FIGS. 7A and 7B are an illustration in a top view each of a detail of an illumination module including two arrays of light sources S1, S2 in which the light sources are differently arranged. In array S1 of light sources, the light sources (symbolized by small black circles) are periodically arranged, even two-dimensionally periodically, the light sources being located in a square grid. In array S2 of light sources, the light sources (symbolized by small open squares) are not periodically arranged (and neither regularly arranged), but, e.g., randomly distributed, as illustrated. The light sources of both arrays S1, S2 are arranged such that they can illuminate the microlens array (not illustrated, but similar as in FIGS. 1 and 4).

In FIG. 7A, the arrays are aside each other. In FIG. 7B, however, the arrays are overlapping each other, such that the light sources of the first array S1 and the light sources of the second array S2 are interspersed or interlacing. This can also be considered as mutually superimposed arrays of light sources.

In both cases (FIG. 7A and FIG. 7B), the mode selector 10 is operated such that in the first mode, the microlens array is illuminated by LSA S1 only and that in the second mode, the microlens array is illuminated by LSA S2 only, wherein it is also possible that in the second mode, the microlens array is illuminated by both microlens arrays S1 and S2. Instead of merely switching on and of light sources, mode selector 10 could control the emitted light intensities in a graded way.

In the first and optionally also in the second mode, the equation described above can be fulfilled.

The wavelength of the light emitted by the first array S1 can be identical with or, alternatively, be different from the wavelength of the light emitted by the second array S2.

The emission plane of the first array S1 can be identical with or, alternatively, be different from the emission plane of the second array S2.

FIGS. 8A and 8B are an illustration in a top view each of a detail of an illumination module including two arrays of light sources S1, S2, wherein a wavelength of the light emitted by the light sources of LSA S1 is different from a wavelength of the light emitted by the light sources of LSA S2.

The light sources of both arrays S1, S2 are arranged such that they can illuminate the microlens array (not illustrated, but similar as in FIGS. 1 and 4). However, in array S1 of light sources, the light sources (symbolized by small black circles) emit light at a wavelength which is not emitted by light sources of array S2 (symbolized by open circles).

In one of the arrays or in both arrays S1, S2, the respective light sources can be periodically arranged, even two-dimensionally periodically, the light sources being located, e.g, on a square grid, as illustrated in FIGS. 8A, 8B In FIG. 8A, the arrays S1, S2 are aside each other. In FIG. 8B, however, the arrays are overlapping each other, such that the light sources of the first array S1 and the light sources of the second array S2 are interspersed or interlacing. This can also be considered as mutually superimposed arrays of light sources.

In both cases (FIG. 8A and FIG. 8B), the mode selector 10 is operated such that in the first mode, the microlens array is illuminated by LSA S1 only and that in the second mode, the microlens array is illuminated by LSA S2 only, wherein it is also possible that in the second mode, the microlens array is illuminated by both microlens arrays S1 and S2. Instead of merely switching on and of light sources, mode selector 10 could control the emitted light intensities in a graded way.

In the first and optionally also in the second mode, the equation described above can be fulfilled.

The emission plane of the first array S1 can be identical with or, alternatively, be different from the emission plane of the second array S2.

In array S1 of light sources, the light sources can be (as illustrated in FIGS. 8A, 8B) periodically arranged, even two-dimensionally periodically, the light sources being located in a square grid. In array S2 of light sources, the light sources can be arranged like in array S1 (as illustrated in FIGS. 8A, 8B), but it can also be provided that the light sources in one or both of arrays S1, S2 are arranged in a different way.

FIG. 9 is an illustration of an illumination module with two arrays S1, S2 of light sources and with an optional additional optical component 3, in a side view. The additional component can be, e.g., a prism array including a plurality of prisms 4.

Light from the MLA L1 is redirected by the additional optical component 3.

The microlens array MLA LL1 is arranged between the illuminating unit and the additional optical component and thus between the LSAs S1, S2 and the additional optical component.

FIG. 9 can be, e.g., a side view of an illuminating unit of which FIG. 8A illustrates a detail.

FIG. 10 is an illustration of an apparatus 200 for optically determining distances, in a side view and strongly schematized. The apparatus 200 can be used for optical ranging based on illuminating objects in a scene such as objects 50a, 50b and evaluating the reflected light in order to determine distances.

Apparatus 200 includes an illumination module 20 which can be an illumination module as described herein before, and a light sensor 30 for detecting light emitted from the illumination module and reflected from objects in the illuminated scene. Sensor 30 can be an image sensor. Apparatus 200 can furthermore include a controller 50 for controlling and/or reading out the sensor 30, and/or for controlling the illumination module 20, and/or controller can be used for determining distances based on the data obtained by sensor 30. Apparatus 200 can optionally includes an optical system 40 such as one or more lenses.

Light emitted from the illumination module 20 in the first mode of operating module 20 is referenced 5A, wherein in FIG. 10, only one exemplary ray is drawn; and light emitted from the illumination module 20 in the second mode of operating module 20 is referenced 5B, wherein in FIG. 10, only one exemplary ray is drawn.

The above-explained operation of the the illumination module 20 in at least two different modes in which light of different light distributions is emitted can facilitate covering a larger range of distances determinable by the apparatus 200 and/or can facilitate to covering a wider range of textures of objects 50a, 50b.

Other implementations are within the scope of the claims.

The invention claimed is:

1. An illumination module, the module being operable in at least two different modes, the module comprising:
   a microlens array comprising a multitude of transmissive or reflective microlenses which are regularly arranged at a lens pitch P;
   an illuminating unit for illuminating the microlens array; and
   a mode selector for selecting in which one of the modes the module operates;
   the illuminating unit comprising a first array of light sources operable to emit light of a first wavelength L1 each and having an aperture each, wherein the apertures are located in a common emission plane which is located at a distance D from the microlens array, wherein in a first one of the modes, $$P^2 = 2 \cdot L1 \cdot D/N$$

and wherein N is an integer with N≥1.

2. The module according to claim 1, wherein the mode selector comprises an actuator for changing a relative orientation in space of the microlens array with respect to the illuminating unit.

3. The module according to claim 1, wherein the mode selector comprises an actuator for changing the distance D.

4. The module according to claim 1, wherein the mode selector comprises an actuator for changing a rotational orientation about an axis perpendicular to the common emission plane of the microlens array with respect to first array of light sources.

5. The module according to claim 1, wherein the illuminating unit comprises a second array of light sources operable to emit light each and having an aperture each, and wherein the mode selector comprises a control unit for controlling a ratio of an intensity of light emitted from the first array of light sources and an intensity of light emitted from the second array of light sources.

6. The module according to claim 5, wherein the control unit is operable to have the light sources of the first array switched on and to have the light sources of the second array switched off in the first one of the modes, and to have the light sources of the second array switched on in a second one of the modes.

7. The module according to claim 5, wherein the light sources of the second array are operable to emit light of a second wavelength L2 each, wherein the second wavelength L2 is different from the first wavelengh L1.

8. The module according to claim 5, wherein the light emitters of the first array of light sources are regularly arranged at a light source pitch Q1, wherein P=Q1, and wherein an axis along which the microlenses are arranged at the pitch P is aligned parallel to an axis along which the light sources of the first array are arranged at the pitch Q1, and wherein the light emitters of the second array of light sources are
   irregularly arranged; or at least one of
   regularly arranged at a light source pitch Q2, wherein P≠Q2;
   regularly arranged at a light source pitch Q2, wherein an axis along which the microlenses are arranged at the pitch P is aligned at an angle with respect to an axis along which the light sources of the second array are arranged at the pitch Q2.

9. The module according to claim 5, wherein the second array of light sources is arranged aside the first array of light sources.

10. The module according to claim 5, wherein the first and the second arrays of light sources are mutually superimposed arrays of light sources.

11. The module according to claim 1, wherein in each of the modes, the emitted light has a different light distribution, and wherein the light distribution in a second one of the modes is more diffuse than the light distribution in the first one of the modes.

12. An apparatus for optically determining distances, the apparatus comprising an illumination module according to claim 1 and an image sensor for detecting light reflected from a scene illuminated by light emitted from the illumination module.

13. An illumination module, the module being operable in at least two different modes, the module comprising:
   a microlens array comprising a multitude of transmissive or reflective microlenses which are regularly arranged at a lens pitch P;
   an illuminating unit for illuminating the microlens array; and
   means for selecting in which one of the modes the module operates;
   the illuminating unit comprising a first array of light sources operable to emit light of a first wavelength L1 each and having an aperture each, wherein the apertures are located in a common emission plane which is located at a distance D from the microlens array, wherein in a first one of the modes, $$P^2 = 2 \cdot L1 \cdot D/N$$

and wherein N is an integer with N≥1.

14. An illumination module, the module being operable in at least two different modes, the module comprising:
   a microlens array comprising a multitude of transmissive or reflective microlenses which are regularly arranged at a lens pitch P;
   an illuminating unit for illuminating the microlens array; and
   a mode selector for selecting in which one of the modes the module operate;
   the illuminating unit comprising one or more light sources operable to emit light of a first wavelength L1 each and having an aperture each, wherein for each of the one or more light sources, an optical path length for light emitted from the respective light source from the respective aperture to the microlens array amounts to one and the same distance D, wherein in a first one of the modes, $$P^2 = 2 \cdot L1 \cdot D/N$$

and wherein N is an integer with N≥1.

15. The module according to claim 14, wherein the light emitted from each of the one or more light sources propagates from the respective aperture to the microlens array along a light path, wherein at least a portion of the light path is running through a material having a refractive index different from 1.

16. The module according to claim 14, wherein the module comprises at least one reflective element, and wherein the light emitted from each of the one or more light sources propagates from the respective aperture to the microlens array along a light path along which it is reflected at least once by the at least one reflective element.

17. The module according to claim 14, wherein the one or more light sources comprise an array of light sources.

18. The module according to claim 14, wherein in the first mode, each of the one or more light sources is arranged to illuminate a respective subset of the multitude of microlenses, and each of the subsets includes a plurality of neighboring microlenses, such that light from each particular one of the one or more light sources passes through different ones of the microlenses in the respective subset so as to produce an interference pattern.

\* \* \* \* \*